May 5, 1931. C. W. DAVIS Re. 18,061

BLUE FLAME MANTLE LAMP

Original Filed July 25, 1927 5 Sheets-Sheet 1

INVENTOR,
Cortland W. Davis,
BY
Thomas G. Stewart,
ATTORNEY.

May 5, 1931. C. W. DAVIS Re. 18,061

BLUE FLAME MANTLE LAMP

Original Filed July 25, 1927 5 Sheets-Sheet 2

Cortland W. Davis,
INVENTOR,

BY Thomas G. Stewart,
ATTORNEY.

May 5, 1931. C. W. DAVIS Re. 18,061

BLUE FLAME MANTLE LAMP

Original Filed July 25, 1927 5 Sheets-Sheet 3

Cortland M. Davis,
INVENTOR,

BY
Thomas G. Stewart,
ATTORNEY.

May 5, 1931. C. W. DAVIS Re. 18,061

BLUE FLAME MANTLE LAMP

Original Filed July 25, 1927 5 Sheets-Sheet 4

Cortland W. Davis,
INVENTOR,

BY
Thomas G. Stewart,
ATTORNEY.

May 5, 1931. C. W. DAVIS Re. 18,061

BLUE FLAME MANTLE LAMP

Original Filed July 25, 1927 5 Sheets-Sheet 5

Cortland W. Davis,
INVENTOR,

BY
Thomas G. Stewart,
ATTORNEY.

Reissued May 5, 1931 Re. 18,061

UNITED STATES PATENT OFFICE

CORTLAND W. DAVIS, OF ALEXANDRIA, INDIANA, ASSIGNOR TO THE MANTLE LAMP COMPANY OF AMERICA, OF CHICAGO, ILLINOIS, A CORPORATION OF ILLINOIS

BLUE FLAME MANTLE LAMPS

Original No. 1,744,298, dated January 21, 1930, Serial No. 208,286, filed July 25, 1927. Application for reissue filed January 9, 1931. Serial No. 507,703.

The invention relates to burners for blue-flame lamps of the wick type in which an incandescent mantle is used, and generally consists in improvements of the parts of a burner of that type, whereby it becomes possible to obtain a full light from the lamp in a short period of time and to reduce the creeping or working-up tendency of the flame, making the lamp more stable and reliable in its operation.

Several improvements, herein described, have been made to accomplish the above results, some of which prevent the overproduction of vapor at the wick, and avoid the formation of carbon deposits upon the mantle. Among the several novel and related improvements which contribute to produce these results, are a new chimney and its retaining means, a new flame spreader, a new burner cone construction and a new flame-protecting baffle.

The invention also involves an incandescent mantle, a mantle support, a means for mounting the mantle upon the support and a new burner element to which the mantle support is attached.

In lamps of the blue-flame type in which an incandescent mantle is used, the greatest defects have always been the length of time required to establish a full flame, and the instability of the flame before and after said flame has attained its full size. In the operation of the blue-flame incandescent lamp an intense heat is developed by the burner, and by radiation and conduction this heat is transmitted through the burner structure. It is characteristic of a lamp of this type that the flame never reaches a constant size until such time as a thermal equilibrium is established, in which the heat received by the burner elements from the flame is equal to that radiated or otherwise lost by these same elements.

The transmission of heat from the flame to the wick tubes, either directly or indirectly through other elements of the burner, constitutes a principal cause for the unreliability and instability of a blue-flame lamp. The wick tubes, being in contact with the wick which supplies the fuel for the burner, in part to this fuel heat which increases the vaporization of the fuel and consequently the flame produced by the burner. The heat from this flame in turn raises the temperature of the wick tubes and increases vaporization of the fuel at the wick. This action is cyclic and produces the phenomenon commonly known as "creeping up" of the flame of the lamp, and often results in the formation of carbon deposits upon the incandescent mantle.

Many of the improvements, herein disclosed, are specifically designed to restrict, or prevent entirely the transmission of heat from the flame to the wick tubes, to thereby lessen or substantially eliminate the creeping up of the flame as above explained. The new burner construction is of such a character that the flame at the tip of the wick is always and materially above the tops of the wick tubes, regardless of the vertical position of the wick, to thereby prevent overheating of the wick tubes and excessive generation of the fuel vapor.

When the burner is in full operation, the flame occupies not only the space immediately above the wick, but the interior of the mantle which is rendered highly incandescent by the high temperature within it. The mantle, being thus incandesced, transmits radiant heat to all proximate parts of the lamp, including the chimney and its retaining means, the mantle mounting and other parts in the path of the heat rays of the mantle. These parts, becoming thus highly heated, would transmit heat by conduction to and overheat other parts of the burner if the burner were not so constructed as to prevent that result.

Experiments have proved that, in the operation of a lamp of the blue-flame type, heated gases accumulate in the annular space around the burner cone and the mantle, and that retention of such heated gases in this space has much to do with the overheating of the wick tubes. This undesirable accumulation of heated gases has heretofore been minimized by admitting at the base of the chimney air currents which, flowing into said annular space, tend to displace said heated gases. It is very necessary that the amount of air thus admitted be properly gauged, and that means be provided for maintaining at all times, the quantity of air admitted at that point. This supply of air assists in keeping the burner, as a whole, in a cool condition, and increases the stability of the lamp. Experiments have also shown that, when too much air is allowed to enter at the chimney base, the normal draft of the chimney will be checked, the normal blue-flame will become semi-luminous and carbon will be deposited on the mantle and still further impair the draft of the lamp.

The base of a chimney, such as usually employed on a blue-flame burner, is of cylindrical form, and the chimney is held in position on the gallery by a series of upwardly-porjecting fingers acting with spring tension on the lower part. One means for allowing air to enter into the space between the chimney and the mantle, includes ribs formed on the deck of the gallery, so that an air space is provided under the bottom of the chimney and over the top of the gallery deck. This method of supporting a chimney on a burner gallery is unsatisfactory. Frequently, the user will not push the chimney all the way down to its supporting ribs, the spring tension of the fingers being sufficient to frictionally sustain the chimney. Under such a condition a greater amount of air passes under the chimney and into the space outside of the mantle, than is desirable for the efficient operation of the burner. It also frequently happens that the chimney becomes slightly tilted to one side, thus permitting a greater introduction of air at one side than the other. This correspondingly reduces the efficiency of the burner. It has also been found that the fingers of the chimney band, due to their proximity to the mantle, become highly heated and transmit heat to the other burner elements.

One object of this invention is, therefore, to provide a chimney for a burner of the blue-flame type, which is so constructed as, in and of itself, to accurately determine the quantity of air admitted at its base to the space within it; and, also, to provide securing means which compels it to assume its proper and true position on the burner.

The horizontal terminal lip of the burner cone, due to its proximity to the flame of the lamp and exposure to the radiant heat of the mantle, is an element of the burner which becomes very highly heated, and an improvement, provided by this invention, consists in forming the burner cone in two sections which are so related as to perform the normal functions of a continuous burner cone, and, at the same time, are separated so as to substantially insulate said terminal lip from the other part of the burner cone, means being provided for conducting heat away from the terminal lip and for dissipating this heat before it can be conducted to any element of the burner which would affect the vaporization of fuel from the wick.

By making the cone of the burner in two sections it becomes possible to utilize the upper section as a removable support for an incandescent mantle. This section of the burner cone, being made as a separate article, admits of a configuration which is best adapted to withstand distortional strains and warping by heat. The utilization of a cone having a separable upper section makes it possible to renew said upper section which, if damaged by denting or other distortion, materially affects the successful operation of the lamp. A feature of the mantle support which is carried by this upper section is means encircling and centralizing the lower end of the mantle and holding it in proper relation to the upper section of the burner cone. This external centralizing device admits of the sustention of the mantle at an altitude which leaves a space between its lower edge and the subjacent part. Free passage of air through this space improves the operation of the burner.

In the operation of blue-flame mantle lamps, it is very important that the mantles be of uniform size and shape. The many openings through the meshes and the single opening at the head of the mantle, constitute ports through which the escaping products of combustion must pass, and hence it is desirable that said single opening, which is the principal port of exit for said products of combustion, shall be of a predetermined and adequate size. The invention includes means for attaining this object, the head of the mantle being made of some metal that is unaffected by the heat of the burner and which can be given a definite size and shape.

Furthermore, it is necessary to provide blue-flame mantle lamps with some means for protecting the flame from the direct impingement of outside air currents, and such protection is especially essential when the burner is first lighted. It has been customary in such burners to utilize for this purpose a small outstanding flame-protecting flange, surrounding the upper extremity of the outer wick tube. I have found that in the operation of lamps of this kind, the oil from the wick flows over and burns on the flame-protecting flange, thereby causing it and the outer wick tube, with which it is in direct contact, to become highly heated and to undesirably affect vaporization of fuel from the wick. This invention includes a flame-protecting baffle which functions in a manner similar to the ordinary wick-tube flame flange, but which, not only is not mechanically connected with the outer wick tube, but is so constructed and mounted as to conduct any heat it may receive from the flame to parts of the burner remote from the outer wick tube where provision is made for the dissipation of the heat. The addition of this novel flame-protecting baffle, admits of the raising of the wick to a much greater extent than is permissible in burners employing only the ordinary outstanding flame flange, with the result that all of the fuel is burned directly from the wick.

A new form of center-tube air spreader also participates in the functioning of the burner. This spreader is of the type having perforated cylindrical and frustro-conical sections, and is distinguished by the absence of the air obstructing and relatively wide web of metal heretofore present at the junction of these two perforated sections. By the elimination of said web of metal the spreader distributes air currents uniformly throughout its entire perforated areas, and also removes an air obstructing factor from the most advantageous point for air delivery.

The invention will be understood if the following specification is considered in connection with the accompanying drawing, in which—

Figure 17:
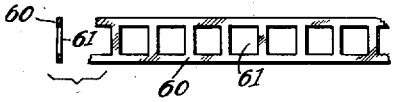
Figure 18:
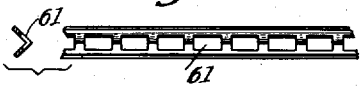
Figure 15:
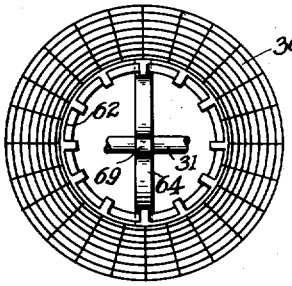
Figure 15 is a top elevation showing the construction of the mantle head.
Figure 19:
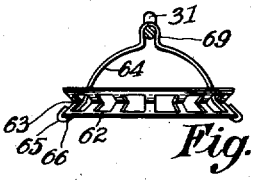

Figures 17, 18, and 19 are detail views of the mantle head.

Figure 20:
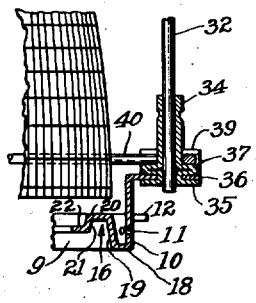

Figure 20 is a fragmentary sectional view of the mantle support showing the construction of the socket supporting the mantle wire.

Figure 1:
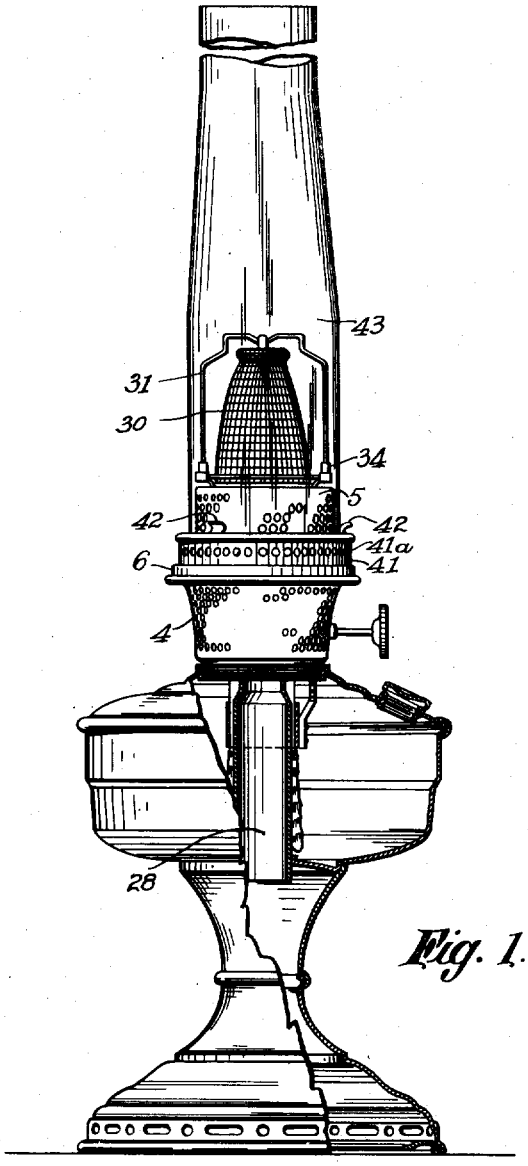
Figure 1 is a front elevation showing the lamp with a part broken away to illustrate the interior construction of the lamp bowl and the central air tube.
Figure 12:
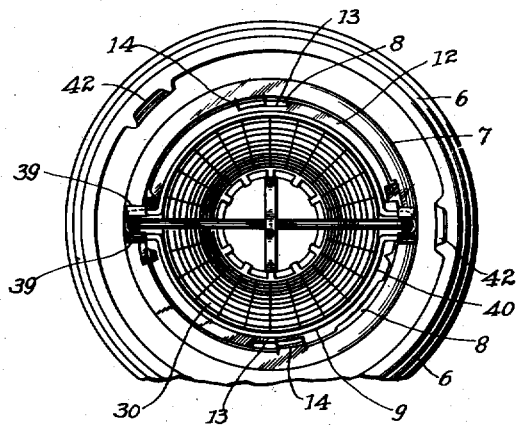
Figure 12 is a top view of the mantle and its support, showing the engagement of the mantle support and the subjacent part of the burner, the chimney being removed.
Figure 11:
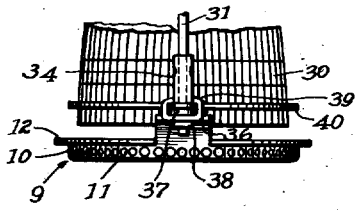
Figure 11 is a fragmentary front elevation showing the mantle and its support.
Figure 14:
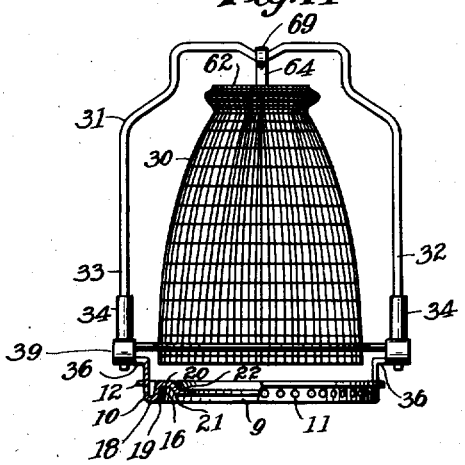
Figure 14 is a front elevation showing a mantle and its mounting complete, a part of the mantle support being shown as broken away.

The burner which is mounted on a bowl of squatty design and having the usual central air passage extending upward therethrough (Figure 1), includes inner and outer wick tubes 1, 2 (Figure 2), a wick 3 operated by a suitable wick raiser, and a perforated basket 4 on which is detachably mounted an air-cooled perforated cylinder 5, constituting a portion of the burner gallery 6, the top edge of this cylinder being bent inward at 7 and having an internal seat 8 (Figures 2, 12) for sustaining the mantle-supporting ring 9 which constitutes a part of the mantle mounting, said ring being provided with a vertical wall 10 (Figures 14, 20) having air holes 11, and with an outwardly-turned flange 12 extending from said wall 10 and over said seat 8. This flange 12 has notches 13 (Figure 12), and the cylinder 5 has lugs 14 (Figure 12) cut from its seat. When the ring 9 and its associated parts are to be connected with said cylinder 5, the notches 13 are made to coincide with the lugs 14, the ring 9 is pushed down upon the seat 8, and said ring is then turned to bring said lugs 14 opposite unnotched parts of the flange 12 to establish an interlock between these two elements.

The burner is provided with a multi-part cone having a primary part 15 (Figure 2) which is suitably supported in the gallery 6 and a supplemental part 22 constituting the lip of said cone, and said part 15 extends upward, terminating within a recess 16 (Figures 2, 14, 20) of the ring 9 and having at its top a small inturned flange 17 which is slightly spaced from the ring 9 at that point to break the heat-conductive path which, otherwise, would exist.

The ring 9 is formed by so shaping a metal annulus that a cross section thereof (Figures 2, 14, 20) shows the perforated wall 10 and its outwardly-turned flange 12, a lower horizontal portion 18, a tapered wall 19, an upper horizontal portion 20, a depending wall 21, and the supplemental cone 22 which extends inward from said depending wall.

The ring 9, as thus made, is very stiff, and, consequently, is not subject to distortion by the intense heat of the burner.

The outer wick tube 2 may be provided with the usual flame flange 23 to diminish the force of an air current which might extinguish or otherwise affect the flame at the tip of the wick, but this invention utilizes a baffle 24 which is separated from the outer wick tube, and is only supported by the gallery 6, as shown. This baffle is perforated, as shown at 25 and 25[a], and is contracted at its upper end so as to leave a small space for the passage of air between it and the outer wick tube 2. Said baffle is provided with an inturned stiffening flange 26 which terminates above the outer wick tube 2 and in such relation to said wick tube that its corner 27 prevents an air current from impinging upon the base of the flame and causing the flame to flicker or to be entirely extinguished.

The perforations 25 in the body of the baffle 24 admit of the cooling of said baffle by air passing upward therethrough, while the perforations 25[a], which are disposed proximate the flange 26, allow small quantities of air to flow upward past the inner edge of the flange 26, to thereby prevent vapor, generated at the wick, from burning on or close to said flange. The baffle 24 is thus prevented from being overheated.

When the burner is to be used, the wick is turned low, and the oil at its tip is lighted. Immediately upon ignition, the wick may be turned up to produce approximately a maximum flame, whereas, in other types of blue-flame burners, this cannot be done.

As soon as the parts of the burner become heated, air will begin to flow through the several passages therein, and into the combustion zone which is, of course, above the tip of the wick, the air thus flowing being admitted from the outside through the perforated basket 4. The entering air current is then divided, the greater part flowing outside of the baffle 24 and a very small part flowing inside said baffle. The main current which is outside of said baffle, is directed upward and inward by the primary cone 15, and is then accurately guided to the combustion zone by the supplemental cone 22 where it impinges upon the vapor rising from the wick. At the same time air flowing upward through the central air tube 1, with which the burner is provided, and outwardly deflected by the spreader 29, impinges upon said vapor, thus establishing conditions which effectively cause the vapor and the air to be thoroughly mixed.

While the upper extremity of this baffle 24 is higher than the top of the outer wick tube 2 and its outstanding flange 23, it is, as is obvious, nearer the tip of the wick, when the wick is turned up to produce a full flame, than is the flame flange at that time. For this reason the outer wick tube 2 is made shorter than usual. Hence, the baffle 24 may be regarded as superseding the usual flame flange 23, which is, however, retained to prevent considerable air flow between the outer wick tube 2 and the baffle 24, a slight flow of air being desirable to prevent accumulation of heated air.

The slight clearance between the baffle 24 and the flame flange 23 prevents conduction of heat from the baffle 24 to the outer wick tube 2. This construction permits exposure of a large area of the wick 3, which is adequately shielded by said baffle 24, with the resulting advantage that the evaporation of the fuel occurs at exposed parts of the wick 3 instead of in parts thereof which are disposed between the outer and inner wick tubes 2 and 1, respectively. The flame, under these conditions, is further from the flame flange 23 than is the flame of a previous similar type burner and is, therefore, so distant from the wick tubes that it does not overheat them.

The provision of a large area of the wick, which is shielded from air currents, makes it possible for the user to produce a large flame from the wick immediately upon the ignition of the fuel at the tip of the wick and to obtain approximately a maximum light from the mantle at once. Several features of this invention, eliminating the transfer of heat from burner elements to the wick tube, make the flame, thus quickly produced, stable in size, and avoid the "creeping up" of the flame and the usual resulting carbon deposits upon the incandesecent mantle.

Although the burner cone is herein described as consisting of two parts, namely, the parts 15 and 22, it is evident that the gallery 6 which diverts air into the part 15 may properly be regarded as an element of said burner cone, and that the break in the path of heat conducitivity may be made at any point between said part 22 and said gallery 6.

The mantle 30 is supported by a wire 31 which is so bent as to have substantially parallel ends 32, 33. Tubular sockets 34 receive and support these ends, these tubular sockets being in turn supported by the ring 9 having holes 35 (Figure 20) in oppositely disposed lugs 36 thereof, through which said sockets extend. Each socket has a bead 37 which prevents descent thereof in the lug 36, and its lower end 38 is upset to clamp the lug 36 between it and the bead 37.

The lugs 36 have each lateral projections 39, and these projections are bent over a wire 40 which rests on the bead 37 and encircles the mantle 30 to thereby hold said mantle in concentric relation to the burner.

This external centralizing device 40 admits of the sustention of the mantle 30 at an altitude which leaves a space between its lower edge and the subjacent part. Free passage of air through his space improves the operation of the burner.

The gallery 6 has a chimney band 41, having perforations 41[a] and a plurality of inwardly-projecting prongs 42. The base of the chimney 43 is provided with a plurality of downwardly-projecting lugs 44, and the chimney is secured in position on the gallery 6 by the prongs 42 engaging spaced external beads 45 disposed at the base of the chimney. When the chimney is locked in position on the gallery of the burner, the spacing lugs 44 support the chimney at a fixed distance above the gallery deck 46 and provide a clearance space 47 for the passage of air entering through perforations in the gallery band. The air thus admitted flows over the deck of the gallery, as shown by the arrows (Figure 6), and into the space inside of the chimney and outside of the incandescent mantle and the burner cone.

Figure 10:
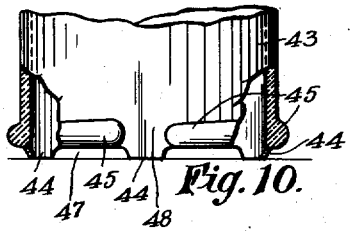
Figure 10 is a front elevation partly in section, showing a modified type of chimney.
Figure 9:
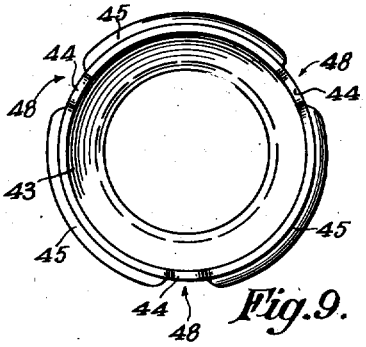
Figure 9 is an end view of the base of the chimney shown in Figure 8.
Figure 8:
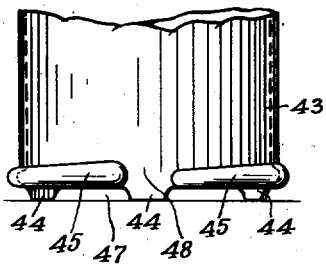
Figure 8 is a front elevation of the base of the chimney shown in Figure 6.
Figure 13:
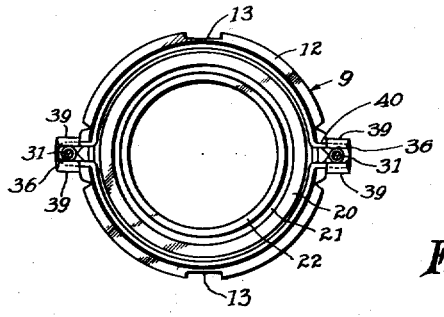
Figure 13 is a plan view of the mantle support.

The spaces 48 between the beads 45 are sufficiently wide to admit the prongs 42, so that the chimney may be entered into the gallery past these prongs. The tops of the beads 45 are slightly tapered, as shown in Figures 8, 10 so that when the chimney is inserted and turned, the prongs 42 will ride over and tighten on said ribs to firmly hold the chimney in position.

By extending the downwardly-projecting lugs 44 at the base of the chimney below the bottom of the chimney a correct distance, it is possible to establish a predetermined clearance between the underside of the chimney and the top of the gallery deck 46, and allow for an air passage at this point of any desired capacity. This clearance space will be definitely established each time the chimney is placed in positon in the gallery, as it is impossible to operate the bayonet catch mechanism for supporting the chimney in the gallery without first properly putting the chimney in position on the gallery deck 46 with the protruding lugs 44 resting on the deck of the gallery.

In the operation of a blue-flame burner fitted with an improved chimney in accordance with this invention, currents of air are induced to flow under the chimney by the draft of the chimney, as shown by the arrows (Figure 6), and these currents of air prevent stagnation of heated gases in the space 49 and assist in the combustion of fuel vapors at the meshes of the mantle 30. It will be noted that it will be impossible for a user to improperly position this chimney in the gallery or tilt the chimney to one side, the prongs 42 and the beads 45 forming a bayonet catch which very securely and definitely holds and positions the chimney in its proper relation to the gallery.

The prongs 42 are in contact with the relatively cool lower end of the chimney, and hence receive and transmit to the gallery 6 very little heat; also, the perforations 41[a] of the chimney band 41 admit the air which passes under the chimney and aid in cooling these several parts. This construction possesses a thermal utility which is not derivable from other constructions wherein the chimney-retaining fingers extend upward and are in contact with a highly-heated part of a chimney, it being desirable to keep the extraneous parts of a blue-flame burner as cool as possible so that internal parts, including the wick tubes, will not be environed by hot elements which prevent said internal parts from losing acquired heat, and thus to become unduly heated.

Figure 2:
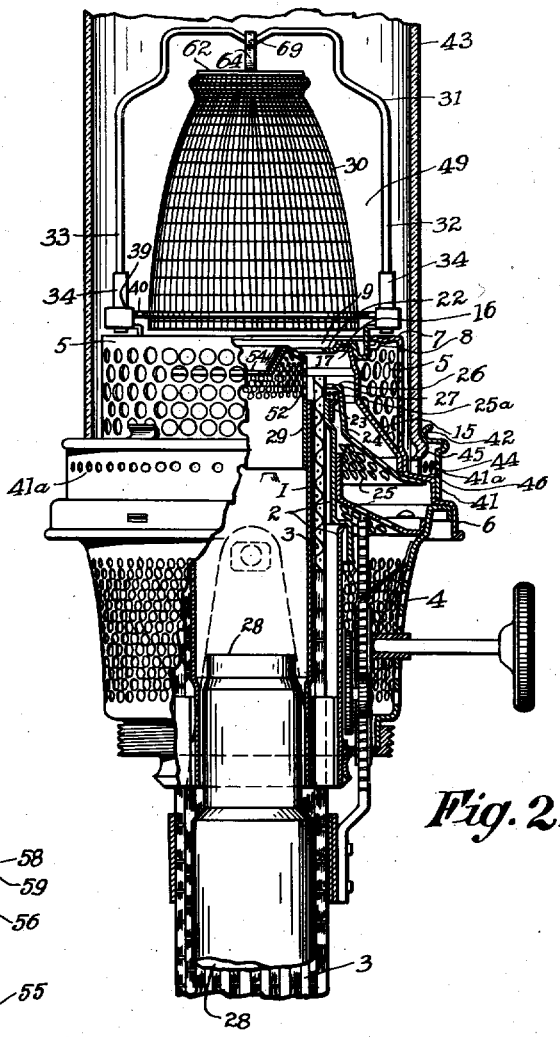
Figure 2 is an enlarged view of the burner, parts thereof being shown in section.
Figure 7:
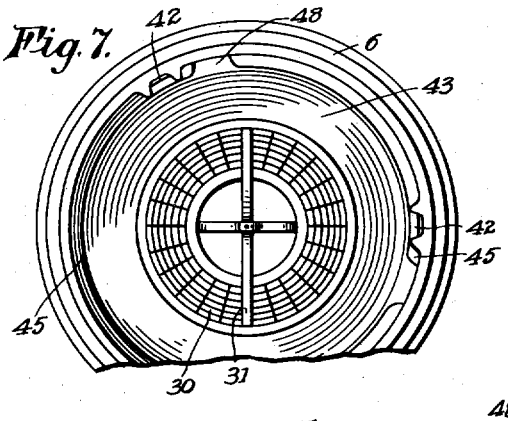
Figure 7 is a plan view showing the chimney secured in position on the gallery of the burner.
Figure 6:
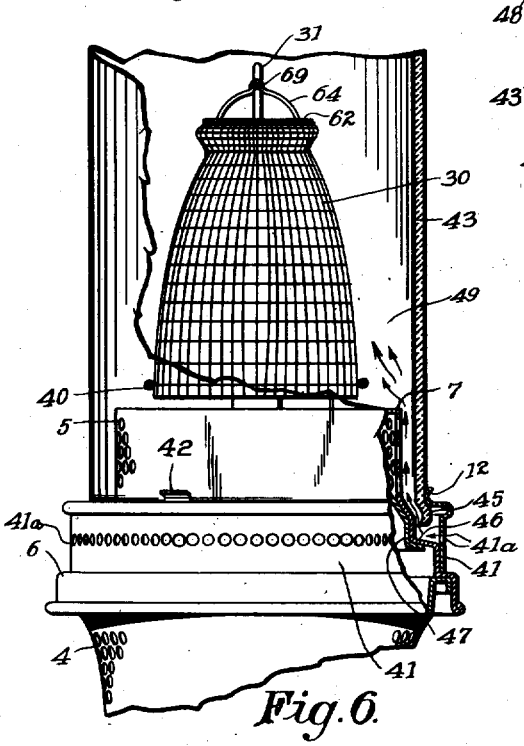
Figure 6 shows a front elevation of a portion of the burner, parts being broken away to reveal an air passage at the base of the chimney.

A modified form of the chimney is shown in Figure 10, in which the beads at the bottom of the chimney are solid, while the beads on the chimney, as shown in Figures 2, 6, 8 are hollow. Both types of chimney function in the same manner on a burner. The beads and lugs at the bottom of the chimney, shown in Figures 2, 6, 8, are made by reheating the bottom of a straight-sided chimney and crimping the bottom edge while hot to form the beads and projecting prongs, while the beads at the bottom of the modified chimney shown in Figure 10, are made solid by a press and blow operation at the time the chimney is made.

In the making of either type chimney, the process of forming the bottom, which consists in forcing the glass outward against either a mold or a crimping machine, makes it possible to definitely size to a predetermined diameter, the inside wall of the chimney base, to thereby secure a correct clearance for air currents, not only under the chimney, but also upward inside the chimney and between it and the perforated cylinder carried by the gallery.

Figure 3:
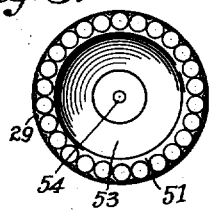
Figures 3 and 4 illustrate the flame spreader shown in Figure 2.

The flame spreader 29 (Figures 2, 3, 4) which is supported in the upper end of the inner wick tube 1, has a cylindrical body 50 and a frusto-conical wall 51, both of which are provided with minute perforations 52 through which air flowing upward from the central air passage 28 of the bowl and through said inner wick tube 1, may pass. The distinguishing features of this flame spreader are, first, continuity of the perforated areas of the cylindrical body 50 and the frusto-conical wall 51, which are not, as in other flame spreaders, separated by a narrow heat-absorbing and air-obstructing bridge of metal; and, second, a depressed central portion 53 of the frusto-conical form which, being somewhat removed from the high-temperature combustion zone, is kept relatively cool so that it will conduct little heat to the inner wick tube. Said central portion 53 operates to uniformly deflect the rising air currents towards all the aforesaid perforations of the spreader, thus facilitating flow of said currents through said perforations and into the flame; and this depressed central portion has a perforation 54 of suitable size, the object thereof being to prevent induced low-pressure conditions within it and the consequent drawing of the flame against the spreader. The employment of a flame spreader of this design, tends to prevent overheating of the inner wick tube, maximizes the quantity of air supplied to the interior of the flame and renders uniform the distribution of air emanating from both the cylindrical and the frusto-conical area of the spreader.

The process of making the new flame spreader consists in first producing a cylinder (Figure 5) having an imperforate lower portion 55, a perforated upper portion 56 in which the number and size of the holes are the same as those of the completed spreader 29, and a flat and imperforate top wall 57.

The upper extremity 58 of the cylinder is also imperforate.

Figure 4:
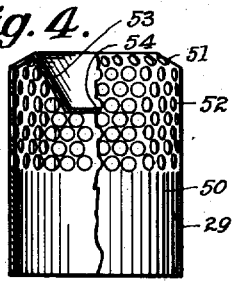
Figure 5:
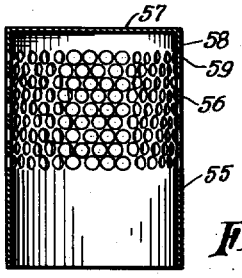
Figure 5 shows a step in the process of manufacturing the completed spreader shown in Figures 3 and 4.

The cylinder, thus produced, is subjected to the action of dies whereby the top wall 57 is drawn and depressed, and so much of the cylinder as includes said upper extremity 58 and the uppermost row 59 of the perforated portion 56, is shaped to assume the form shown in Figures 4, 5. The perforation 54 is then made.

Figure 16:
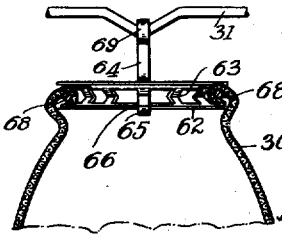
Figure 16 is a sectional view of the mantle head.

The mantle head (Figures 2, 15, 16, 17, 18, 19) is produced from a flat strip of metal 60 (Figure 17) having preferably square holes 61, which, after being bent to V-shape (Figure 18), is curved to constitute a ring 62 having an external groove 63, (Figures 16, 19). This device is provided with a sustaining strip 64 fashioned at its end 65 to embrace at 66 the lower edge of said ring 62, said ends being disposed within said ring so that the upper edge 67 of the mantle 30 and its retaining cord 68 may be placed and held within said groove 63. The strip 64 is bent at its middle part to form an eye 69 through which the mantle sustaining wire 31, extends.

A mantle having a head thus constructed, will possess an outlet port of determinate size and shape which permits the free outflow of the products of combustion and generally improves the draft of the lamp. Furthermore, this construction makes it possible to so standardize all mantles that their outlet ports will be uniform. If, as heretofore, the sizes of the outlet ports of mantles vary, the operations of lamps in which they are used will lack uniformity. By making all mantles identical, at least in so far as their outlet ports are concerned, this difficulty is substantially overcome.

An advantage derivable from the use of a mantle mounted as hereinbefore described, is that a mantle may be given any desired diameter, the diameter being unrestricted by the predetermined size of a mating part, as, for instance, the cone of a burner. Also, by divorcing the cone and the mantle, the body of the cone may be of any desired size or shape, so long as its terminal lip is properly related to the combustion zone of the burner, to thus provide room within it for the addition of a baffle or other useful element.

The great stability of the new burner is principally due to the fact that a change in the temperature of the metal parts surrounding the outer wick tube does not materially influence the volume of fuel evaporated at the wick, the construction being such that the size of the flame is almost entirely dependent upon the area of wick exposure. The clearance space between the outer surface of the wick and the baffle flange 26, together with the area of the openings 25ᵃ, and the clearance space between the flange 23 and the baffle 24, are the factors which determine the altitude of the base of the flame. These factors are such that the base of the flame is always held in the chamber above the flange 23, to thereby prevent excessive quantities of heat from being radiated to this flange from the flame and subsequently conducted to the outer wick tube.

To achieve these results, I have found that the clearance between the flame flange 23 and the baffle 24 should approximate .015 of an inch; that the clearance between the outer surface of the wick and the flange 26 should approximate .090 of an inch; that the perforations 25ᵃ should approximate .060 of an inch in diameter and be spaced approximately .100 of an inch apart; that these perforations 25ᵃ should be very near the top of the baffle 24 and close to the flange 26, and that the distance between the top of the flange 23 and the top of the flange 26 should be at least 1/8 of an inch. Under these conditions, the flame will burn from the outside of the wick in such a manner that the base of the flame will be below the flange 26 and nearly opposite the perforations 25ᵃ.

Having thus described my invention, what I claim is:

1. A blue-flame burner of the wick type, including a cone and inner and outer wick tubes, a wick disposed between said tubes, and a baffle surrounding and slightly spaced from said outer wick tube, said baffle terminating at a point which is higher than the top of said outer wick tube and having an opening at its top of substantially greater diameter than the diameter of said wick.

2. A blue-flame burner of the wick type, including a cone and inner and outer wick tubes, a flame flange surrounding the upper extremity of said outer wick tube, a wick disposed between said tubes, and a baffle surrounding and slightly spaced from said outer wick tube, said baffle terminating at a point which is higher than the top of said outer wick tube and having an opening at its top of substantially greater diameter than the diameter of said wick.

3. A blue-flame burner of the wick type, including a cone and inner and outer wick tubes, a wick disposed between said tubes, and a baffle surrounding and slightly spaced from said outer wick tube and having an inturned flange at its top of substantially greater diameter than the diameter of said wick, said baffle terminating at a point which is higher than the top of said outer wick tube.

4. A blue-flame burner of the wick type, including a cone and inner and outer wick tubes, a wick disposed between said tubes, and an air-cooled baffle surrounding and slightly spaced from said outer wick tube and having an opening at its top of substantially greater diameter than the diameter of said wick, said baffle terminating at a point which is higher than the top of said outer wick tube.

5. A burner of the blue-flame type, including inner and outer wick tubes, a wick, and a baffle spaced from said outer wick tube and having an inturned flange and perforations proximate said flange, said flange being disposed in a plane above the top of the outer wick tube and also spaced from the outer wick tube and from said wick.

6. A lamp of the blue-flame type including a multipart cone having a primary part for directing air towards the combustion zone, and an independently supported supplemental part for accurately guiding the air received from said primary part to said combustion zone.

7. A lamp of the blue-flame type including a gallery, concentric wick tubes, a wick disposed between said wick tubes, a multipart cone having a primary part for directing air towards the space above said wick, and a supplemental part spaced from said primary part to heat insulate it therefrom, and to accurately guide the air received from said primary part to said space.

8. A lamp of the blue-flame type including a gallery, concentric wick tubes, a wick disposed between said wick tubes, a multipart cone having a primary part mounted on said gallery and a supplemental part for accurately guiding air received from said primary part to the space above said wick, and exterior supporting means for said supplemental part for conducting heat away from said supplemental part.

9. A lamp of the blue-flame type including a gallery, concentric wick tubes, a wick disposed between said wick tubes, a multipart cone having a primary part for directing air towards the space above said wick, a supplemental part spaced from said primary part for accurately guiding the air received from said primary part to said space, and means for conducting heat away from said supplemental part.

10. A blue-flame burner including a multipart cone having a primary part, and a supplemental part having a groove into which the upper edge of the primary part extends.

11. A blue-flame burner including a multipart cone having a primary part, and a supplemental part, said supplemental part being spaced and receiving air from said primary part and constituting a mantle-supporting element.

12. A blue-flame burner including wick tubes, a multipart cone structure having a heat-insulated element for accurately guiding air to the space above said wick tubes, and a deflector spaced from the proximate wick tube for preventing air currents from unduly disturbing the flame in said space, said deflector being also spaced from said cone.

13. A blue-flame lamp including wick tubes, a multi-part cone structure for accurately guiding air to the space above said wick tubes, and a perforated deflector spaced from and surrounding the proximate wick tube.

14. A blue-flame oil burner of the wick type including an outer wick tube, an inner wick tube, a wick therebetween which extends considerably above said outer wick tube when the burner is in operation, a burner cone, a baffle between said burner cone and the exposed outer surface of said wick forming a chamber between the exposed outer surface of said wick and said baffle, and means for introducing air into said chamber, said chamber providing a flame-protective zone for the base of a flame burning on the outer exposed surface of the wick, and the base of said flame being at an altitude above the bottom of said chamber.

15. A blue-flame oil burner of the wick type including an outer wick tube, an inner wick tube, a wick therebetween which extends considerably above said outer wick tube when the burner is in operation, a burner cone, a baffle between said burner cone and the exposed outer surface of said wick forming a chamber between the exposed outer surface of said wick and said baffle, and means for introducing air into said chamber from below, said chamber providing a flame-protective zone for the base of a flame burning on the outer exposed surface of the wick, and the base of said flame being at an altitude above the bottom of said chamber.

16. A blue-flame oil burner including a wick, a wick tube surrounding said wick, a burner cone, a baffle positioned between said cone and said wick tube and forming a flame-protecting chamber between it and the exposed surface of the wick, said chamber being freely open at its top and having a restricted entrance at its bottom, the air admission to said chamber being such that the base of the flame is prevented from reaching the bottom of the chamber.

17. A blue-flame oil burner including a wick, a wick tube surrounding said wick, a burner cone, a baffle positioned between said cone and said wick to form an air passage on the outside of said baffle for air supplied to the upper part of a flame burning from said wick and to form a flame-protecting chamber for the base of said flame, there being associated with said chamber air admission means for preventing said flame from directly impinging on the baffle.

18. A lamp of the blue-flame wick type, including a wick, means for supplying air to both sides of said wick, a deflector to so control the flow of air to the combustion zone that the flame of the lamp will be substantially spaced from the wick tube of the lamp.

19. A burner of the blue-flame-wick type, including a wick tube, a wick, a flame flange disposed substantially at the upper end of said wick tube, a baffle proximate said wick tube and having air openings near its upper end, and a flange extending inward from the upper extremity of said baffle, said air openings lying in a plane above the top of the wick tube and the aggregate area thereof and the clearance spaces between said flame flange and said baffle, and between the said flange and said wick, being such as to cause the base of the flame to be higher than said flame flange and lower than the tip of said wick.

20. A blue-flame oil burner including a cone, a wick, a baffle and a wick tube surrounding said wick, said baffle being positioned adjacent and terminating substantially above the top of said wick tube and forming a chamber around the outer exposed surface of the wick, when said wick is fully raised, air admission to which chamber is restricted, whereby the base of the flame produced on the wick is maintained in said chamber and is separated from subjacent parts of said chamber.

21. An oil burner of the blue-flame type including a cone, a wick, a baffle, an outer wick tube surrounding said wick, and a flame protecting element, said baffle being positioned adjacent to and terminating substantially above the upper extremity of said outer wick tube and said flame-protecting element, thereby forming at the bottom of the outer exposed surface of the wick, when raised, a combustion chamber, air admission to which chamber is restricted, whereby the flame propagation in said chamber is so controlled that the base of a flame produced on the wick is maintained at the surface of the wick in said chamber and out of contact with said outer wick tube and said flame-protecting element.

22. An oil burner of the blue-flame type including a cone, a wick, a baffle, an outer wick tube surrounding said wick, and a flame-protecting element, said baffle being positioned adjacent to and terminating substantially above the upper extremity of said outer wick tube and said flame-protecting element, thereby forming at the bottom of the outer exposed surface of the wick, when raised, a combustion chamber, air admission to which chamber is restricted, whereby the flame propagation in said chamber is so controlled that the base of a flame produced on the wick is maintained at the surface of the wick in said chamber and out of contact with said outer wick tube and said flame-protecting element, the flame-protecting element being positioned at the upper extremity of said outer wick tube and substantially out of metallic contact with said baffle.

23. A blue-flame burner including a wick, a burner cone, a baffle, and a wick tube surrounding said wick and having a flame-protecting element at its upper end, said baffle being positioned between said flame-protecting element and said burner cone and terminating substantially above said wick tube and forming exteriorly a major air passage to the upper section of a flame rising from the wick and interiorly a chamber adjacent the bottom of the outer exposed surface of the wick, air admission to which is restricted, whereby the base of the flame is maintained within said chamber and out of contact with said wick tube and said flame-protecting element.

24. A burner of the blue-flame type including a wick, a wick tube surrounding said wick, a burner cone, and a baffle surrounding and spaced from said wick tube, thereby forming a combustion chamber therebetwen having a restricted air inlet, the upper end of said baffle terminating at a point which is sufficiently high relatively to the top of said wick tube to admit of such raising of the wick that the flame may be maintained only on the upper portion of the exposed surfaces, and said cone being so related to said baffle that an adequate passage for air flowing to the combustion zone above the top of said wick is provided between said cone and said baffle.

25. A blue-flame burner including a wick, a cone having an internal lip for directing air to the space above said wick, and means independent and exterior of the cone of said burner for sustaining said lip and dissipating heat received by said lip during the operation of the burner.

26. A blue-flame burner of the wick type including a gallery, a burner-cone section supported from an air-cooled portion of said gallery which is disposed exterior of said burner cone section.

27. A blue-flame burner of the wick type including a burner cone consisting of a plurality of sections, one of which is a continuation of the other, the upper section of said burner cone being supported by an air-cooled element of the burner.

28. A blue-flame burner of the wick type including a sectional burner cone, and a heat-insulating air gap in said burner cone for resisting conduction of heat through said sectional burner cone.

29. A blue-flame burner of the wick type including a sectional cone, and a perforated support for the terminal section of said cone, said perforated support being disposed outside of and spaced from said cone to thereby facilitate the flow of air through its perforations.

30. A removable burner-cone top comprising a ring having interiorly a lip, the body of said burner-cone top being ribbed to prevent distortion thereof.

31. A removable burner-cone top comprising a ring having exteriorly a flange and interiorly a lip, the intermediate section of said burner-cone top being ribbed to prevent distortion thereof.

32. A removable burner-cone top including a ring having an inside lip terminating below the upper surface of said burner-cone top.

33. A removable burner-cone top comprising a ring having interiorly a lip, and provided with a plurality of annular strengthening ribs.

34. A removable burner-cone top comprising a ring having annular strengthening ribs, one of said ribs being a depressed portion, and the other of said ribs being a raised portion of said ring.

35. A blue-flame mantle burner of the wick type, including means for holding a chimney on the burner, and means interposed between the mantle and said chimney-holding means for intercepting and dissipating radiant heat emanating from the mantle.

36. A blue-flame oil burner of the wick type, including a gallery, a wick and a cone for directing air to the space above said wick, there being in said burner a heat-insulating air gap for preventing direct conduction of heat from the top of said cone to said gallery.

37. A blue-flame oil burner of the wick type having a burner cone and an outer wick tube, and an air-guiding baffle disposed with its upper end below the upper end of the wick when the wick is raised to its operative position and in such relation to the burner cone and the outer wick tube as to produce between it and the burner cone a major air passage, and between it and the outer wick tube a minor air passage, which leads to the exposed surface of the wick and through which a very small current of heat-insulating air may flow to prevent overheating of the outer wick tube.

38. A blue-flame oil burner of the wick type having a burner cone and an outer wick tube, and a flame-protecting baffle disposed with its upper end below the upper end of the wick when the wick is raised to its operative position and in such relation to the burner cone and the outer wick tube as to produce between it and the burner cone a major air passage, and between it and the outer wick tube a minor air passage which leads to the exposed surface of the wick and through which a very small current of heat-insulating air may flow to prevent overheating of the outer wick tube.

39. A blue-flame oil burner of the wick type having a burner cone and an outer wick tube, and a baffle disposed with its upper end below the upper end of the wick when the wick is raised to its operative position and in such relation to the burner cone and the outer wick tube as to produce between it and the burner cone a major air passage, and between it and the outer wick tube a minor air passage which leads to the exposed surface of the wick and through which a very small current of heat-insulating air may flow to prevent overheating of the outer wick tube, said baffle having an inturned flange at its upper end.

40. A blue-flame oil burner of the type having a wick, a burner cone, an outer wick tube, and a flame-protecting baffle, said baffle being spaced from said outer wick tube by a small heat-insulating air space through which a limited quantity of air flows to the outer exposed surface of the wick, the air for sustaining combustion flowing exterior of said baffle and being so directed to the flame burning on the outer exposed surface of the wick that said flame is prevented from burning down and coming in contact with the outer wick tube.

41. A burner of the blue flame type, including an outer wick tube, a wick having when raised to operative position a flameless exposed side area proximate and a flame area somewhat remote from said outer wick tube, and an air restricting baffle surrounding and heat insulated from said outer wick tube and operating to so limit the flow of air within it that the flame is maintained only on the flame area of the wick.

In testimony whereof I affix my signature.

CORTLAND W. DAVIS.